United States Patent [19]

Yuki et al.

[11] Patent Number: 4,511,475
[45] Date of Patent: Apr. 16, 1985

[54] OPTICALLY ACTIVE POLYMER PREPARATION AND USE

[75] Inventors: Heimei Yuki, Sakai; Yoshio Okamoto, Amagasaki, both of Japan

[73] Assignee: Daicel Chemical Industries, Ltd., Sakai, Japan

[21] Appl. No.: 443,725

[22] Filed: Nov. 22, 1982

Related U.S. Application Data

[62] Division of Ser. No. 235,233, Feb. 17, 1981, Pat. No. 4,375,495.

[30] Foreign Application Priority Data

Feb. 19, 1980 [JP] Japan .................................. 55-19555

[51] Int. Cl.³ .............................................. B07C 5/36
[52] U.S. Cl. ...................................... 210/635; 210/656
[58] Field of Search ................ 526/307.7, 326, 173; 428/402; 210/198.2, 656, 635; 55/65, 67, 386

[56] References Cited

U.S. PATENT DOCUMENTS

| | | | |
|---|---|---|---|
| 2,524,414 | 10/1950 | Wolfrom et al. | 210/656 |
| 3,065,185 | 11/1962 | Burns et al. | 210/656 |
| 3,280,087 | 10/1966 | Natta et al. | 526/326 |

OTHER PUBLICATIONS

Yuki et al., J. Pol. Sci., Part B, 6, 753–755, (1968).

Primary Examiner—Harry Wong, Jr.
Attorney, Agent, or Firm—Flynn, Thiel, Boutell & Tanis

[57] ABSTRACT

A novel optically active polymer comprising structural elements of the formula:

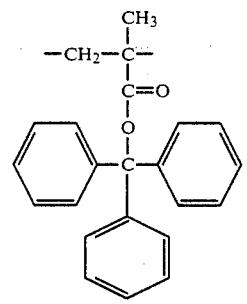

The polymer is applicable for the optical resolution of a racemic mixture through, for instance, column chromatography.

9 Claims, 3 Drawing Figures

OPTICALLY ACTIVE POLYMER PREPARATION AND USE

This is a division of application Ser. No. 235,233, filed Feb. 17, 1981, now U.S. Pat. No. 4,375,495, issued Mar. 1, 1983.

This invention relates to an optically active polymer, a process for the preparation of the same, and a process for using the same. More particularly, this invention relates to a process for the preparation of an optically active polymer having a high optical rotation value based on molecular asymmetry, which comprises polymerizing triphenylmethyl methacrylate, which does not contain per se an asymmetric carbon atom and does not show optical activity, using an optically active polymerization initiator, and also relates to the thus-obtained polymer. Moreover, this invention particularly relates to a process for the optical resolution of a racemic mixture by means of the thus-obtained optically active polymer.

It is known that a monomer which does not contain per se an asymmetric carbon atom and does not show optical activity, can be polymerized, in the presence of an optically active polymerization initiator, to form a polymer which shows an optical activity higher than that of the employed polymerization initiator whose optical activity is based on the optically active group contained therein.

For instance, it was reported that methyl methacrylate undergoes anionic polymerization, in the presence of an optically active Grignard reagent, to form an isotactic polymer which shows an optical activity which is too high to be thought of as being derived from the optical active group introduced as the terminal group to the polymer (Preprint (summary) for the 22nd Annual Meeting of The Chemical Society of Japan, 1969, p. 2111). On the other hand, a monosubstituted or $\alpha,\alpha$-disubstituted olefin which does not contain an asymmetric carbon atom is not, up to now, known to form a polymer having a remarkable optical activity. The term "remarkable optical activity" means that the optical rotation of the produced polymer is far higher than that originating from any possible error in the measurement by a polarimeter or that given by the asymmetric fragment of the polymerization initiator. For reference' sake, even the above-mentioned optically active poly(methyl methacrylate) has a specific rotation ($[\alpha]_D^{25}$) of only approximately 2° as the absolute value.

Triphenylmethyl methacrylate is known to form an isotactic polymer, regardless of the polymerization conditions, because of the steric hindrance due to the presence of the bulky substituent groups. The thus-obtained polymer is thought to have isotactic chains of tightened helix structures. This polymer still shows no optical activity if it is produced by polymerization using a conventional polymerization initiator, because the thus-produced polymer has the same number of right- and left-handed helical molecules (J. Polym. Sci. Part B, 6, 753 (1968)).

The present inventors have succeeded in preparing a highly optically active polymer of triphenylmethyl methacrylate by polymerizing triphenylmethyl methacrylate, in the presence of an optically active anionic polymerization initiator.

Accordingly, this invention provides an optically active polymer comprising recurring structural units of the formula:

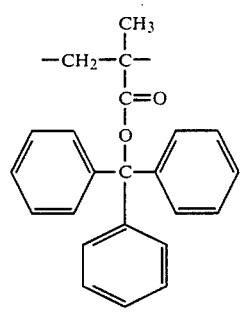

and having a polymerization degree of not less than 5, which polymer has a specific rotation $[\alpha]_D^{20}$ of not less than 50° as the absolute value. This invention also provides a process for the preparation of that polymer by effecting an ionic polymerization of triphenylmethyl methacrylate in the presence of an optically active anionic catalyst.

The characteristic features of the polymer of the present invention reside in the facts that the spiral direction of the helix structure of the polymer is biased to only one of the two possible directions and that there is provided a prominently high optical rotation which is considered to be derived from the special helix structure.

The optical activity of the polymer is clearly explained by the existence of the biased helix structure as follows.

(1) The polymer shows a high optical activity, even though the monomer, triphenylmethyl methacrylate, has no asymmetric carbon atom.

(2) If the polymerization is carried out using the butyllithium-(−)-sparteine complex as the initiator, the obtained polymer of triphenylmethyl methacrylate should contain an optically inactive butyl group only as the fragment of the initiator. Nevertheless, the thus-obtained polymer shows a high optical rotation.

(3) The polymer of [S]-1-phenylethyl methacrylate shows a negative optical rotation, whereas a polymer of triphenylmethyl methacrylate obtained using the thus-produced low molecular weight anion of [S]-1-phenylethyl methacrylate polymer, as the initiator, shows a positive optical rotation.

(4) (R)-N-(1-Phenylethyl)aniline shows a specific rotation $[\alpha]_D^{20}$ of −19.5°, whereas a polymer of triphenylmethyl methacrylate prepared by the polymerization reaction using its N-lithium compound shows a specific rotation $[\alpha]_D^{20}$ of not less than −70°, that is, far higher in comparison with the value of the initiator.

(5) The circular dichroism spectrum of the polymer of triphenylmethyl methacrylate shows great absorptions at 208 nm and 232 nm attributable to a phenyl group and a carbonyl group. These absorptions are still observed in the spectrum of a polymer of triphenylmethyl methacrylate prepared using a polymerization initiator containing no phenyl group, such as the butyllithium-(−)-sparteine complex.

The reasons why the polymer of the present invention shows such a high optical activity can be hypothetically explained as follows.

When an alkali salt of an optically active compound, such as lithium (R)-N-(1-phenylethyl)anilide, is employed as the polymerization initiator, a fragment of the initiator, such as the (R)-N-(1-phenylethyl)anilino group, is attached to a growing chain end of the polymer or a monomer unit attached to the fragment during propagation serves through its asymmetric structure for biasing or preferentially producing one spiral direction of the helix structure of the produced polymer. Accordingly, the polymer is given a high optical activity.

When a complex such as butyllithium-(−)-sparteine is employed as the initiator, the (−)-sparteine molecular attached to the growing chain end of the polymer in the form of a ligand attached to the lithium counter ion serves, through its asymmetric structure, to restrict the spiral direction of the helix structure of the produced polymer to one direction. The thus-biased spiral structure of the helix is maintained in the polymer even after the polymerization reaction is completed. Accordingly, the polymer is given a high optical activity.

The novel polymer of the present invention is crystalline, and one having a polymerization degree of at least about 70 is insoluble in conventional organic solvents. Even a lower molecular weight polymer, which is soluble in the solvent, precipitates when the solution is heated to 60° C. But, the precipitates are again dissolved in the solvent upon cooling, and it maintains a stable high optical activity with no decrease.

The monomer for providing the recurring units of the optically active polymer of the present invention, that is, triphenylmethyl methacrylate, can be prepared by a known method. For instance, it can be prepared by reacting a silver salt of methacrylic acid with triphenylmethyl chloride in ether (refer to N. A. Adrova and L. K. Prokhorova, Vysokomol. Soedin. 3, 1509 (1961)).

The polymer of the present invention can contain one or more copolymerizable monomer units different from the principal triphenylmethyl methacrylate monomer units, provided that the introduction of the other monomer does not damage the optical activity of the polymer. The content of the copolymerizable monomer is not higher than 20 mole %. Examples of copolymerizable monomers include styrene and derivatives thereof such as α-methylstyrene, conjugated dienes such as butadiene and isoprene, acrylic ester and methacrylic ester such as alkyl($C_1$–$C_{20}$, preferably $C_1$–$C_{10}$) acrylate, alkyl($C_1$–$C_{20}$, preferably $C_1$–$C_{10}$) methacrylate, nitriles such acrylonitrile and methacrylonitrile and N,N-disubstituted acrylamides, preferably substituted by an alkyl($C_1$–$C_{10}$). The polymer thus produced can be either a block copolymer or a graft copolymer.

The polymer of the invention can be produced through the ionic polymerization.

As a polymerization initiator employed for the polymerization, an optically active anionic catalyst or initiator is effective. Examples of optically active anionic catalysts include an alkali metal compound of an optically active organic compound and a complex compound of an organic alkali metal compound coordinated with optically active organic compound ligands. For instance, lithium (R) or (S)-N-(1-phenylethyl)anilide and a complex between (+) or (−)-sparteine or a derivative thereof and an alkyl lithium, such as (−)-sparteine-n-BuLi, (−)-6-ethylsparteine-n-BuLi, (+)-6-benzylsparteine-n-BuLi and (−)-dihydrosparteine-n-BuLi, can be mentioned as a suitable initiator. The lithium (R)-N-(1-phenylethyl)anilide can be prepared by the reaction of (R)-N-(1-phenylethyl)anilide and n-BuLi. Its enantiomer can be employed as well. The (−)-sparteine-n-BuLi can be prepared by mixing (−)-sparteine with n-BuLi at room temperature.

As another complex compound used as the initiator, there can be mentioned a complex compound of living polymer anions of monomers such as styrene, a derivative thereof and a methacrylic acid ester with (−) or (+)-sparteine or a derivative thereof.

The polymerization reaction can be carried out in a solvent. There is no specific limitation on the solvent to be used, provided that the solvent dissolves the monomer employed and the low molecular weight polymer undergoing propagation. Naturally, a solvent that inhibits the anionic polymerization and the formation of the optically active polymer cannot be employed.

Examples of suitable solvents are as follows: When lithium (R)-N-(1-phenylethyl)anilide is employed as the polymerization initiator, the solvent is selected from benzene, toluene, tetrahydrofuran (THF), dioxane, dimethoxyethane, diethyl ether, pyridine, tetrahydropyran, dimethylsulfoxide (DMSO), DMF and so forth. When (−)-sparteine-n-BuLi is employed as the initiator, the solvent is selected from benzene, toluene, dioxane, diethyl ether, hexane-benzene mixture, hexane-toluene mixture and so forth. However, THF cannot be employed as a solvent for the latter case.

The polymerization reaction can be carried out at a temperature ranging from −98° C. to +60° C., preferably from −78° C. to +40° C.

The thus-produced polymer is a living polymer. Therefore, the polymer is preferably blocked at the terminals by the use of an alcohol or the like, after the reaction is complete.

The polymer of the present invention has an isotactic structure and is highly optically active. The specific rotation of the polymer is not less than 50° as the absolute value, the value being expressed by $[\alpha]_D^{20}$ determined in THF. Such a high optical rotation of the polymer is caused by the molecular asymmetry which originates from the tightly coiled helix structure of the molecule due to the existence of the bulky triphenylmethyl ester groups resulting in one spiral direction as mentioned above.

The polymer can be a mixture of polymers having different polymerization degrees. Accordingly, the above-mentioned value can be an average of the optical rotations of the constituent polymers.

The specific rotation can be determined as follows: 0.05–0.3 g of the polymer is dissolved in 10 ml of THF, and the thus-obtained solution is placed in a cell (5 cm). The measurement is done in a Yanagimoto direct reading polarimeter, model OR-10. The specific rotation values described in the present specification and claims are values resulting from measurements made in the above-described manner.

The polymer of the present invention is sparingly soluble in a conventional solvent such as THF, if the polymer has a high molecular weight. In such a case, the measurement of the specific rotation is difficult. Accordingly, another expedient should be employed for measuring specific rotation; for instance, the polymer that is insoluble in THF is partially hydrolyzed so that the partially hydrolyzed polymer is soluble in THF. The THF solution thus obtained is then subjected to the measurement of specific rotation. The specific rotation of the original polymer (insoluble in THF) is considered to be higher than the value obtained in the above manner using the partially hydrolyzed polymer. In this procedure, the hydrolysis should be stopped just after dissolution of the polymer in THF begins. If the hydrolysis proceeds to completion, the optical rotation disappears.

The polymer of the present invention shows absorption bands at 208 nm, 232 nm, and 257-280 nm (4 absorption bands) in the CD spectrum (circular dichroism spectrum) measured in THF. The CD spectral data described herein are those obtained in the measurements made on a JASCO J40 CD apparatus (manufactured by Japan Spectroscopy Co., Ltd., Japan). The polymerization degree can be measured by gel permeation chromatography (GPC). This GPC analysis can be directly applied to a soluble polymer. An insoluble polymer can be subjected to the GPC analysis after the polymer is hydrolyzed to give a poly(methacrylic acid) and then the acid is esterified into a poly(methyl methacrylate).

The optically active polymer of the present invention can be employed for the optical resolution of a racemic mixture.

Accordingly, the present invention further provides a process for the optical resolution of a racemic mixture which comprises bringing the racemic mixture into contact with the optically active polymer described hereinbefore.

The chromatographic process for the optical resolution of optical isomers comprising passing a solution of a racemic mixture through a column charged with an optically active material which serves as an absorbent is known. The optically active materials applicable to that purpose are, for instance, starch (disclosed in West German Pat. Nos. 1,013,637, 1,013,655 and 1,016,713), modified natural products such as carboxycellulose (disclosed in U.S. Pat. No. 2,957,917), and synthesized ion exchange resins (disclosed in Belgian Pat. No. 621,135).

Those known chromatographic processes for the optical resolution of optical isomers, however, have some disadvantageous aspects. For instance, those processes show only a low level of efficiency in the optical resolution or they are applicable to only a limited group of the optical isomers. Even if a substantial amount of the optically active material is employed in the process for the optical resolution, the desired complete optical resolution of the optical isomers is not achieved. Thus, the product obtained from the optical resolution according to the known chromatographic process is still a mixture of the optical isomers slightly enriched with one isomer in comparison with the other isomer. The optical isomers to which the chromatographic processes are applicable are limited to those containing such groups as a carboxylic acid group, an amino group or a hydroxyl group. This means that the optical isomers are optically resolvable under such conditions that there are some appreciable interactions between the optical isomers and the absorbent, for instance, salt formation or the formation of the hydrogen bond. These requirements inherently present in the conventional chromatographic processes sometimes have prevented the process from being used for practical purposes.

Accordingly, an object of the present invention is to provide an optical resolution process free of the drawbacks described above. The process for the optical resolution of the present invention generally comprises a chromatographic process using a new absorbent consisting of an optically active organic polymer of a new type and which is entirely different from the conventional absorbents. The optically active polymer of the present invention enables efficient optical resolution and is applicable for the optical resolution of a wide variety of optical isomers.

The mechanism of the optical resolution achieved in the employment of conventional absorbents is thought to be as follows: The polymers which are employed or proposed as the absorbents for the optical resolution contain in their molecular structures optically active groups based on the presence of asymmetric carbons or functional groups such as carboxylic acid groups, amino groups and hydroxyl groups. When a racemic mixture is brought into contact with the conventional absorbent to enter into interaction therewith, such as forming a salt with the functional group or forming the hydrogen bond, the sterically asymmetric structure around the asymmetric carbon atoms affects each of the optical isomers of the racemic mixture differently whereby to result in the optical resolution.

In contrast, the polymer of the present invention contains substantially no optically active groups based on the presence of asymmetric carbon atoms in the molecular structure. Instead, the molecule is, as a whole, of a helical structure, biased in the right direction or the left direction so that the molecular structure of the polymer is asymmetrical due to the molecular asymmetry. Accordingly, the polymer of the invention shows a high optical activity. Moreover, the polymer has a prominently high crystallinity because of its high stereoregularity. The highly crystalline structure causes the polymer to be insoluble or sparingly soluble in most organic solvents regardless of the absence of crosslinked bonding in the molecule.

Accordingly, the optical resolution employing the polymer of the present invention, as the absorbent, has the following advantageous aspects.

(1) The asymmetric molecular structure extends or spreads all over the surface of the absorbent consisting of the polymer, so that the optical resolution of a racemic mixture is efficiently carried out.

(2) Even a compound having no functional group, such as a carboxy, amino or hydroxyl group, can be optically resolved. Particularly noted is that a racemic mixture consisting of hydrocarbons, whose optical resolution has heretofore been almost impossible, can be efficiently resolved optically when the present polymer is employed as the absorbent.

In view of its application as an absorbent, the polymer of the present invention necessarily has a polymerization degree of not less than 20. More preferred is a polymer having a polymerization degree of not less than 50, and polymers having a polymerization degree of not less than 100 are most preferred.

As to the racemic compound which can be subjected to the optical resolution of the present invention, the following description applies.

There is no specific limitation on the racemic compound to be treated by the present optical resolution process, provided that the racemic compound is soluble in a solvent. Examples of the racemic compounds include aliphatic, alicyclic and aromatic hydrocarbons, halides, alcohols, aldehydes, ketones, carboxylic acids, amines, ethers, esters, amides and nitriles. More concretely, there can be mentioned hexahelicene, tetramethyl[2,2]paracyclophane, 1-phenylethyl alcohol, menthol, camphor, muscone, 1-phenylethylamine, Tröger's base, styrene oxide, menthyl benzoate, pinacolyl methacrylate, [8],[8]paracyclophane, transbicyclo[8,8,0]octadeca-1(10)-ene, and so on.

In carrying out the process for the optical resolution, the racemic mixture is preferably pretreated to change same into the ester, acetal or acylated mixture as is desired so that the efficiency of the resolution is improved.

For instance, menthol can be transformed into menthyl benzoate or menthyl p-t-butylbenzoate by an appropriate reaction prior to the optical resolution. The thus-transformed menthol is then subjected to the optical resolution process of the present invention.

The process for optical resolution, according to the present invention, is also applicable to the optical resolution of a racemic polymer. For instance, a racemic mixture of the poly(triphenylmethyl methacrylate) according to the invention can be efficiently subjected to the optical resolution process.

For carrying out the optical resolution process according to the present invention, the optically active polymer is charged into a column in the form of a powder or granules. The optical resolution can be carried out by the so-called liquid chromatographic process using the thus-prepared column. The powder or granules of the polymer to be charged in the column is preferably formed to have as fine and uniform a particle size as is possible. A particle size is preferred to range from 1 to 100 microns. Further, the particles are preferably shaped into as perfect spheres as is reasonably possible to obtain.

According to the invention, it is possible that the polymer of the invention is combined with a fixing material and is charged into a column. As the fixing material there may be used any conventional one which can be combined with the polymer of the invention, for example inorganic packing materials such as silica gel, alumina and glass beads and organic adsorbents such as polystyrene, polyamide and polyacrylate. Those fixing materials may be treated in advance to for instance with a silane compound. The polymer according to the invention may be combined with the fixing material by a physical coating method or a chemical interaction therebetween. The coating method can be effected, for example by dissolving the polymer of the invention is a suitable solvent to give a solution thereof, then mixing the solution with a fixing material and drying it. In another way, the polymerization procedure to give the polymer according to the invention may be conducted in the presence of a fixing material to be used. At that time, it is required to use a fixing material having no influence on the polymerization and the resulting polymer. It is further added that the fixing material to be used in the invention is preferred to be, superficially or totally, porous microparticles. For the purpose porous silica is suitable. The amount of the polymer is from 0.01 to 100 wt. % based on the weight of a fixing material.

As a polymeric fixing material, there may be used cross-linked polystyrene and cross-linked poly(methyl methacrylate).

When the fixing material as mentioned above is combined with the polymer and charged into an optical resolution column. The following advantageous effects can be obtained.

(1) The amount of the polymer to be required for the purpose of the optical resolution can be reduced to a considerable extent.

(2) The number of columns can be increased in comparison with the case where only the polymer is charged into a column.

(3) The period of time which the optical resolution takes is shortened very much.

(4) The polymer according to the invention which has so low a polymerization degree as to be soluble in a solvent can be effectively used for the purpose of the optical resolution by combination with a fixing material (5) Clogging in a column can be avoided; the performance obtained is stable and constant; and durability is obtained.

(6) The desired column is manufactured with ease and constant performance is obtained because the packing material is prepared from the solution of the polymer.

For carrying out the optical resolution process according to the present invention, an appropriate solvent is necessarily selected for use in liquid chromatography. In other words, the solvent should be a solvent for the racemic mixture and also should be a solvent having an excellent eluting activity.

Figure 1:
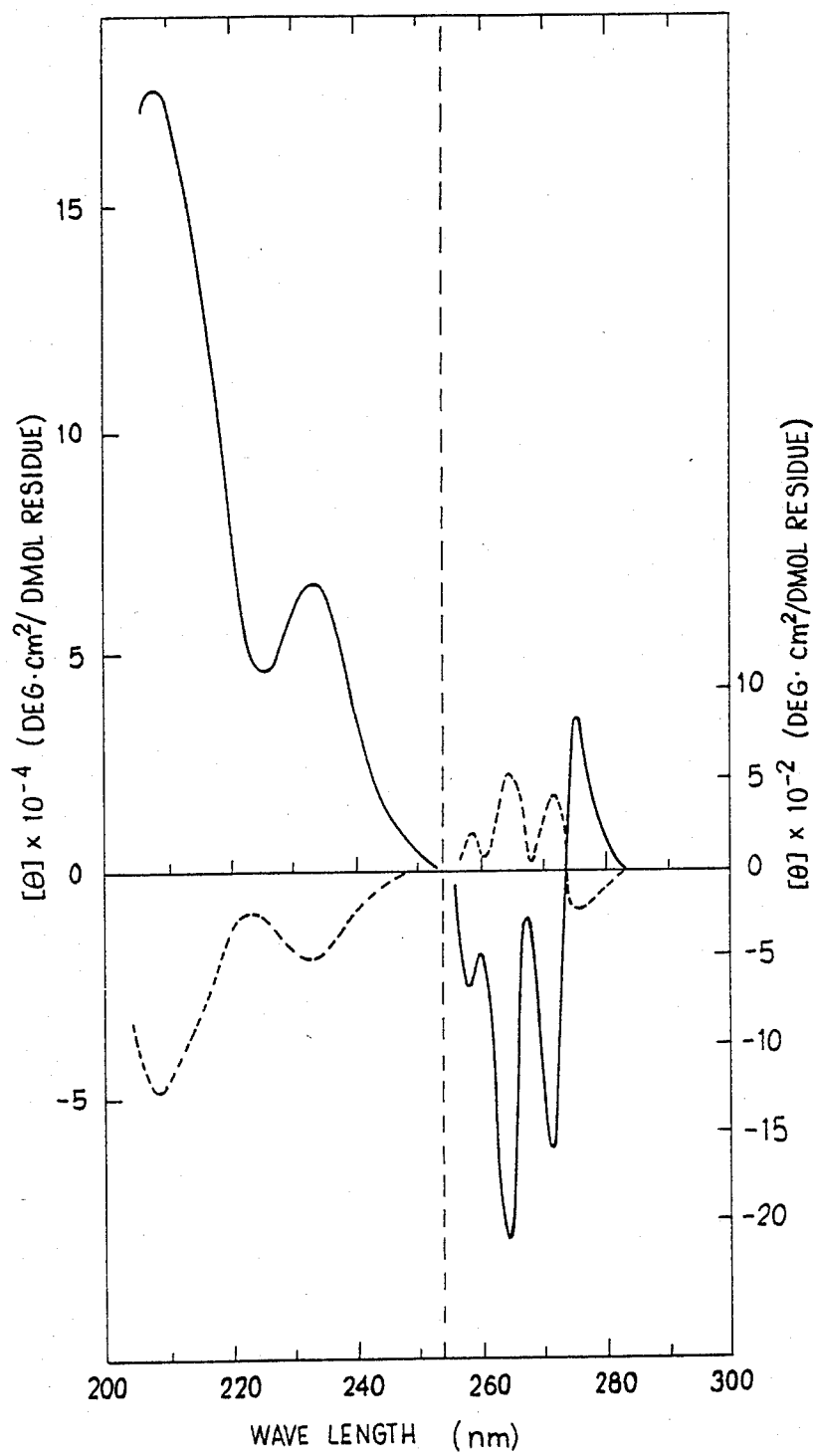
FIG. 1 is the circular dichroism spectrum of the polymer prepared in Synthesis Example 3 (solid line) and the corresponding spectrum of the polymer prepared in Synthesis Example 4 (broken line).

The present invention is further described by the following illustrative synthesis examples for preparing the optically active polymer of the present invention and the following illustrative optical resolution examples of the optical resolution process of the invention. These examples do not restrict the scope of the present invention.

SYNTHESIS EXAMPLE 1

In 200 ml of toluene was dissolved 10.0 g (30.4 mmol) of triphenylmethyl methacrylate. To the solution was added n-butyllithium-(—)-sparteine (1:1.2, mol/mol) in toluene, at −78° C., so that the n-butyllithium was added to the triphenylmethyl methacrylate in the ratio of 1/50 (mol/mol). The tube containing the mixture was sealed, and the reaction was carried out at −78° C. After 3 hours had passed, 3 ml of the reaction mixture was taken out for determining the optical rotation at −78° C. $[\alpha]_D^{-78} = +410°$ was observed in toluene. The polymer yield was 0.045 g.

The reaction was further continued for 24 hours, and then the reaction temperature was elevated to −40° C. The reaction was subsequently carried out at −40° C. for 4 hours The sealed tube was opened, and the contents were poured into 2 l of methanol to precipitate the produced polymer. The polymer was then collected by filtration, washed with methanol, and dried under reduced pressure. There was obtained 9.85 g of the polymer. The polymer product was fractionally dissolved in chloroform to give 9.7 g of the purified polymer as the insoluble.

The thus-purified polymer had a polymerization degree of 210, and was insoluble in THF. Then, a sample of the polymer was partially hydrolyzed in a mixture of methanol and HCl until the polymer acquired a certain degree of solubility in THF, and the partially hydrolyzed polymer was then subjected to the measurement of the optical rotation. $[\alpha]_D^{20}$ was not less than +50°.

Another sample of the purified polymer, which was not subjected to a hydrolyzing treatment, was subjected to the CD (circular dichroism) spectral determination. The obtained CD spectrum was identical to that of the polymer obtained in Synthesis Example 3 shown in FIG. 1 in the form of a solid line.

SYNTHESIS EXAMPLE 2

In 800 ml of toluene was dissolved 40 g of triphenylmethyl methacrylate. Separately, a complex catalyst solution was prepared from n-butyllithium in the amount of 2 mol % based on the above dissolved monomer and (−)-sparteine in the molar amount of 1.2 times as much as the n-butyllithium. The thus-prepared catalyst solution was added to the monomer solution, and the polymerization reaction was carried out at −78° C. for 60 hours. The reaction was further continued at 0° C. for one hour. The reaction mixture was then poured into 5 l of methanol, with stirring, to precipitate the produced polymer. The polymer was separated out, washed with methanol and dried. The dried polymer was ground and dispersed in 700 ml of tetrahydrofuran (THF). After sufficient stirring, the dispersion was centrifuged to separate a polymer product insoluble in THF. The separated polymer was washed with methanol and dried. Thus, 38.70 g of a THF-insoluble polymer was obtained.

In the course of the above-described polymerization reaction, 3 ml of the reaction mixture was taken out for the determination of the optical rotation, as in Synthesis Example 1. The optical rotation was measured at −78° C. and showed $[\alpha]_D^{-78} = +560°$ in toluene. The polymer yield was 0.125 g.

The thus-prepared polymer had a polymerization degree of 248, and was insoluble in THF. Then, a sample of the polymer was partially hydrolyzed in a mixture of methanol and HCl, and the partially hydrolyzed polymer was subjected to the measurement of the optical rotation. $[\alpha]_D^{20}$ was not less than +50°.

SYNTHESIS EXAMPLE 3

In a sealable 1.0 cm quartz optical cell was placed 0.15 g of triphenylmethyl methacrylate. To the triphenylmethyl methacrylate was added 3 ml of toluene so as to dissolve the triphenylmethyl methacrylate therein. The mixture was then cooled to −40° C. To this solution was added a toluene solution containing n-butyllithium in the amount of 5 mol % based on the triphenylmethyl methacrylate and (−)-sparteine in the molar amount of 1.2 times as much as the n-butyllithium, dissolved in toluene, at room temperature.

The reaction mixture contained in the optical cell was kept at −40° C. in a polarimeter, and the optical rotation was continuously measured. The optical rotation increased as the reaction proceeded, and reached $\alpha_D^{-40} = +2.40°$ when the reaction period reached 1.5 hours.

The reaction mixture was taken out and 30 ml of methanol was added. Thus, the produced polymer was precipitated. The polymer was collected by filtration, washed with methanol, and dried at room temperature.

The thus-prepared polymer had a polymerization degree of 42 and a specific rotation of $[\alpha]_D^{20} = +262°$. The yield was 100%. The CD spectrum of the obtained polymer is given in FIG. 1 in the form of a solid line.

SYNTHESIS EXAMPLE 4

In 5 ml of toluene was dissolved 1.2 millimoles of optically active (R)-(1-phenylethyl)aniline ($[\alpha]_D^{25} = -19.5°$, in methanol). To this was added 5 ml of toluene containing 1.0 millimole of n-butyllithium, and the mixture was caused to react at room temperature to prepare a polymerization initiator.

Separately, 6.5 g of triphenylmethyl methacrylate was dissolved in 130 ml of toluene, and the resulting solution was cooled to −78° C. After addition of the polymerization initiator prepared as described above, the mixture was caused to react for 3 hours under dry nitrogen.

The reaction mixture was poured into methanol to precipitate the produced polymer. The polymer was collected by filtration, washed with methanol and dried to give 4.75 g of the polymer.

The thus-prepared polymer had a polymerization degree of 62 and a specific rotation of $[\alpha]_D^{20} = -70°$. The CD spectrum of the polymer is given in FIG. 1 in the form of a broken line. The intensity of the absorption was proportional to the optical rotation.

SYNTHESIS EXAMPLE 5

The polymerization reaction described in Synthesis Example 4 was repeated, using tetrahydrofuran as the solvent, for 2.3 hours.

There was obtained 6.05 g of the polymer. The thus-obtained polymer had a polymerization degree of 21, and a specific rotation of $[\alpha]_D^{20} = -82°$.

OPTICAL RESOLUTION EXAMPLE 1

To 100 ml of hexane was added 7.35 g of the chloroform-insoluble fraction of the triphenylmethyl methacrylate polymer which had been prepared in the manner as described in Synthesis Example 1 and which had been ground in advance of the addition. The mixture was allowed to stand at room temperature for 24 hours. Subsequently, the mixture was charged into a glass tube (inner diameter 9.5 mm, length 37.5 cm) equipped with a stopcock, and then 150 ml of hexane was passed through this column over a period of about 20 hours. The thus-prepared column was employed for the optical resolution described below.

A solution of a racemic mixture of the Tröger base of the formula (I)

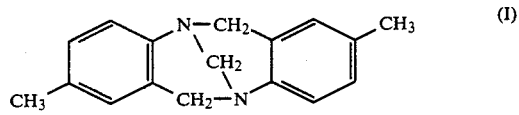

in hexane (23.5 mg/2 ml) was slowly dropped onto the top of the column. After this procedure was complete, 10 ml of hexane was dropped onto the top of the column to develop the base through the column. This development was carried out at a rate of the addition of 0.19 ml/min, and the eluate was collected by a fraction collector to obtain 3.3 ml fractions. Each fraction was subjected to the measurements for the optical rotation and UV spectrum. The thus-determined absorption at 247 nm on the UV spectrum was applied to a calibration curve to determine the concentration of the base in the solution. The specific rotation of the base was calculated from the optical rotation value and the thus-determined concentration, and then the optical purity was calculated based on the fact that the specific rotation $[\alpha]_D^{25}$ for the base at the optical purity of 100% was −274°.

The amount of the base contained in the 14th through 18th fractions was 11.82 mg, and $[\alpha]_D^{25}$ was in the range of −258°−−281° (in hexane). Therefore, the optical purity of the base obtained in these fractions was approximately 100%. The base contained in the 23rd through 29th fractions amounted to 5.42 mg, and $[\alpha]_D^{25}$ was in the range of −258°−−278° (in hexane). Therefore, the optical purity of the base obtained in these fractions was approximately 100%.

OPTICAL RESOLUTION EXAMPLE 2

160 mg of a racemic mixture of 1-phenylethyl alcohol was subjected to the optical resolution through the same column as employed in Optical Resolution Example 1. The procedure for the optical resolution was the same as in the Optical Resolution Example 1.

The eluate was collected to give 10.5 ml fractions. The alcohol contained in the 4th fraction amounted to 5.4 mg and showed $[\alpha]_D^{25}$ of +23° (in CCl$_4$). Therefore, the optical purity was 42%. The alcohol contained in the 6th fraction amounted to 49.4 mg and showed $[\alpha]_D^{25}$ of −7.4°.

OPTICAL RESOLUTION EXAMPLE 3

133 mg of a racemic mixture of 1-phenylethylamine was subjected to the optical resolution through the same column as employed in Optical Resolution Example 1. The procedure for the optical resolution was the same as in the Optical Resolution Example 1.

The eluate was collected to give 4.2 ml fractions. The amine contained in the 7th fraction amounted to 45.5 mg ($[\alpha]_D^{25}$ = +11.8° (in hexane) and the optical purity was 29%). The amine contained in the 9th fraction amounted to 7.9 mg. ($[\alpha]_D^{25}$ = −15° (in hexane) and the optical purity was 37%).

OPTICAL RESOLUTION EXAMPLE 4

27.6 mg of a racemic mixture of tetramethyl[2,2]cyclophane of the formula (II)

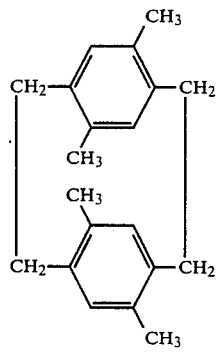

(II)

was subjected to the optical resolution through the same column as employed in Optical Resolution Example 1. The procedure for the optical resolution was the same as in the Optical Resolution Example 1.

The elution was carried out at the rate of 0.15 ml/min, and the eluate was collected to give 3.1 ml fractions.

The amount of the paracyclophane and its specific rotation in various fractions were as follows:

| Fraction No. | Amount (mg) | $[\alpha]_D^{25}$ (in hexane) |
| --- | --- | --- |
| 11 | 2.9 | −22° |
| 12 | 12.7 | −6.7 |
| 13 | 8.6 | +9.9 |

-continued

| Fraction No. | Amount (mg) | $[\alpha]_D^{25}$ (in hexane) |
| --- | --- | --- |
| 14 | 2.7 | +18.9 |
| 15 | 0.5 | +30.8 |

OPTICAL RESOLUTION EXAMPLE 5

70 mg of a racemic mixture of [8],[8]-paracyclophane of the formula (III)

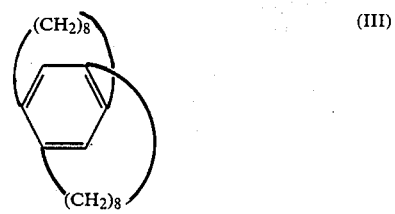

(III)

was subjected to the optical resolution in the same manner as described in Optical Resolution Example 4.

The amount of the paracyclophane and its specific rotation in various fractions were as follows:

| Fraction No. | Amount (mg) | $[\alpha]_D^{25}$ (in hexane) |
| --- | --- | --- |
| 7 | 0.5 | +43° |
| 8 | 24 | +3.2 |
| 9 | 36 | −1.3 |
| 10 | 8.3 | −3.2 |
| 11 | 0.7 | −28 |

OPTICAL RESOLUTION EXAMPLE 6

In 6 ml of hexane was dispersed 109 mg of the chloroform-insoluble fraction of the triphenylmethyl methacrylate polymer prepared in the same manner as described in Synthesis Example 1. In this dispersion was dissolved 7.49 mg of hexahelicene of the formula (IV)

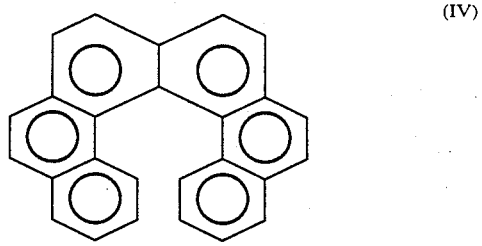

(IV)

The mixture was stirred at room temperature for 40 min, and allowed to stand for 30 min. This was then centrifuged to separate a supernatant liquid from a precipitate.

The UV spectrum of the supernatant showed the absorption ($\epsilon$ = 30,000) at 310 nm. The amount of the hexahelicene contained in the supernatant was calculated from the absorption intensity to be 4.53 mg. Further, the optical rotation was measured, and a specific rotation of $[\alpha]_D^{25}$ = −490° was obtained.

The precipitate was extracted with 10 ml of hexane to yield 0.33 mg of the hexahelicene $[\alpha]_D^{25}$ = 97.5°. An optically pure helicene (IV) showed $[\alpha]_D^{25}$ = +3700°.

OPTICAL RESOLUTION EXAMPLE 7

The poly(triphenylmethyl methacrylate), that is, the triphenylmethyl methacrylate polymer, prepared in the same manner as described in Synthesis Example 2, was ground to recover 31.7 g of the portion in the size range of 200–250 mesh. The thus-recovered portion was dispersed in hexane, and charged into a glass tube (inner diameter 1.16 cm, length 80.6 cm) in the same manner as described in Optical Resolution Example 1. Thus, a column for the optical resolution was prepared.

Optical resolution of 219 mg of a racemic mixture of 1-phenylethyl alcohol was carried out using n-hexane as the solvent. The elution was carried out at 0.10 ml/min, and the eluate was collected to give 5 ml fractions.

The alcohol collected in the 46th–49th fractions amounted to 56.2 mg, and showed a specific rotation of $[\alpha]_{365}^{25} = +121.0°$ (in hexane). The optical purity was 62.2% (1-phenylethyl alcohol showed $[\alpha]_{365}^{25} = +195°$ (in hexane) at the optical purity of 100%).

The alcohol collected in the 52nd–67th fractions amounted to 54.8 mg, and showed a specific rotation of $[\alpha]_{365}^{25} = -108.7°$ (in hexane). The optical purity was 55.7%.

OPTICAL RESOLUTION EXAMPLE 8

238 mg of dl-styrene oxide was subjected to the optical resolution through the same column as employed in Optical Resolution Example 7. The procedure for the optical resolution was the same as in the Optical Resolution Example 7.

The styrene oxide collected in the 30th and 31st fractions amounted to 58.4 mg, and showed a specific rotation of $[\alpha]_{365}^{25} = -9.42°$ (in hexane).

The styrene oxide collected in the 38th–47th fractions amounted to 28.5 mg, and showed the specific rotations of $[\alpha]_{365}^{25} = +10.5°$ (in hexane) and $[\alpha]_D^{25} = -14.93°$ (in chloroform). The optical purity was 60%. Reference: J. Chem. Soc., (B), 1971, 71. The optically pure (100%) styrene oxide showed $[\alpha]_{365}^{25}$ of 17.5° (in hexane). Therefore, the styrene oxide collected in the 30th and 31st fractions showed an optical purity of 53.8%.

OPTICAL RESOLUTION EXAMPLE 9

151 mg of a racemic mixture of menthol was subjected to the optical resolution in the same manner as described in Optical Resolution Example 7.

The menthol collected in the 17th–19th fractions amounted to 111 mg, and showed a specific rotation of $[\alpha]_D^{25} = +15.5°$ (in hexane). The optical purity was 32%.

OPTICAL RESOLUTION EXAMPLE 10

202 mg of dl-menthyl benzoate was subjected to the optical resolution in the same manner as described in Optical Resolution Example 7. The elution was carried out at a flow rate of 0.076 ml/min.

The menthyl benzoate collected in the 19th fraction amounted to 62.6 mg, and showed a specific rotation of $[\alpha]_{365}^{25} = -129.5°$ (in hexane). The optical purity was 71.1%.

The menthyl benzoate collected in the 22nd–29th fractions amounted to 60.2 mg, and showed a specific rotation of $[\alpha]_{365}^{25} = +94.4°$ (in hexane). The optical purity was 51.9%.

OPTICAL RESOLUTION EXAMPLE 11

38 mg of a racemic mixture of trans-bicyclo[8,8,0]-octadeca-1(10)-ene of the structure (V)

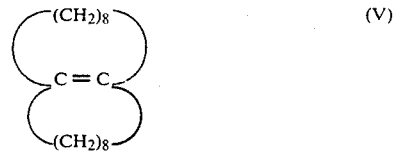

was subjected to the optical resolution in the same manner as described in Optical Resolution Example 7.

The amount of the compound collected in various fractions and the specific rotation of the fractions were as follows:

| Fraction No. | Amount (mg) | $[\alpha]_{365}^{25}$ |
| --- | --- | --- |
| 14 | 0.3 | +266° |
| 15 | 13.7 | +55.1 |
| 16 | 19.4 | −22.9 |
| 17 | 3.6 | −43 |
| 18 | 0.4 | −218 |

OPTICAL RESOLUTION EXAMPLE 12

Figure 2:
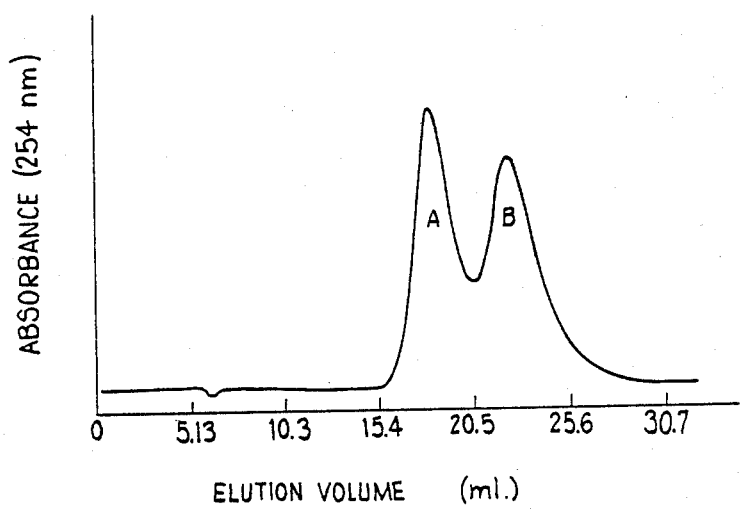
FIG. 2 is a graph showing the results obtained in Optical Resolution Example 12.

3.5 g of the poly(triphenylmethyl methacrylate) prepared in the manner as described in Synthesis Example 2 was ground to give powdery particles of a size of not more than 250 mesh. This was then packed into a column (inner diameter 0.46 cm, length 50 cm) for high-speed liquid chromatography, and the Tröger base (I) was subjected to high-speed liquid chromatography in a JASCO FLC-A10 instrument including the thus-prepared column. A sample solution (0.075 ml prepared by dissolving 2.79 mg of the Tröger base in 1 ml of n-hexane) was introduced into the column, and the development was carried out using cyclohexane containing 1% THF as the developing solvent under a pressure of 24–24.5 kg/cm² and at the rate of 0.205 ml/min. The results are illustrated in FIG. 2 in the form of a curve of absorbence plotted against the amount of the eluate. In view of the result in Optical Resolution Example 1, the peaks A and B are assigned to the Tröger base in the d(+) and l(−) forms, respectively.

OPTICAL RESOLUTION EXAMPLE 13

The polymer obtained in the same manner as described in Synthesis Example 3 was ground, and 77.2 mg of the thus-ground polymer was dispersed in a solution of 5.43 mg of the hexahelicene (IV) in 4.2 ml of n-hexane. The dispersion was then stirred for 40 min and centrifuged to give a supernatant. The supernatant was subjected to the measurements for UV spectrum and optical rotation. The hexahelicene contained in the supernatant amounted to 2.96 mg, and showed a specific rotation of −687°. To the precipitate obtained by the centrifuging was added 7.1 ml of n-hexane, and the mixture was stirred for 3 hours, centrifuged and separated for recovering a supernatant. This procedure was repeated four times, and the amount of the helicene and the specific rotation were determined for each supernatant. The results are as follows:

First supernatant: 1.19 mg, $[\alpha]_D^{25} = -190°$
Second supernatant: 0.325 mg, $[\alpha]_D^{25} = +1200°$
Third supernatant: 0.121 mg, $[\alpha]_D^{25} = +2100°$
Fourth supernatant: 0.053 mg, $[\alpha]_D^{25} = +2700°$

OPTICAL RESOLUTION EXAMPLE 14

In 10 ml of toluene was dissolved 2.0 g of triphenylmethyl methacrylate. This monomer was polymerized at −78° C. in the presence of a catalyst consisting of a racemic mixture of (RS)-N-(1-phenylethyl)aniline in the form of a lithium salt in the amount of 0.2 molar equivalent. There was obtained 0.8 g of a polymer having a polymerization degree of 15. This polymer was soluble in toluene and showed no optical activity.

Separately 108 mg of the optically active triphenylmethyl methacrylate polymer (prepared in the manner as described in Synthesis Example 2) in the powdery form was dispersed in 5 ml of toluene. To this dispersion was added 24.65 mg of the optically inactive polymer obtained in the above manner, and the mixture was stirred sufficiently. Subsequently, the mixture was centrifuged to separate the supernatant from the precipitate. The polymer contained in the supernatant amounted to 11.54 mg, and showed a specific rotation of $[\alpha]_D^{25} = -273°$.

To the supernatant was added 101 mg of the optically active triphenylmethyl methacrylate polymer, and the mixture was stirred and centrifuged. The polymer contained in the thus-separated supernatant amounted to 8.20 mg, and showed the specific rotation of $[\alpha]_D^{25} = -282°$.

The polymer adsorbed by the precipitate given by the first centrifuging was extracted with two 6 ml toluene solvents and with two 6 ml THF solvents. The separation of the supernatant from the precipitate in the extracting procedures was made by a centrifuge. The amount of the polymer and the specific rotation were determined for each extract. The results are as follows:

First extract: 2.76 mg, $[\alpha]_D^{25} = -194°$
Second extract: 0.42 mg, $[\alpha]_D^{25} = -142°$
Third extract: 1.38 mg, $[\alpha]_D^{25} = +76°$
Fourth extract: 1.42 mg, $[\alpha]_D^{25} = +153°$

OPTICAL RESOLUTION EXAMPLE 15

1.2 g of the triphenylmethyl methacrylate polymer prepared in the same manner as described in Synthesis Example 2 was ground to form a powder of not more than 100 mesh size, and was swollen in 20 ml of toluene. This was introduced into a glass tube (inner diameter 9.5 mm, length 9.0 cm) to prepare a column.

The poly(triphenylmethyl methacrylate) having no optical activity and being soluble in toluene, which had been prepared in the manner as described in Optical Resolution Example 14, was subjected to the optical resolution employing the thus-prepared column. The sample (53.0 mg) was dissolved in 2 ml of toluene, and this solution was dropped onto the column. The elution was carried out with toluene at the rate of 1.3 ml/hour, and the eluate was collected to give 2.3 ml portions.

The polymer contained in the first fraction amounted to 8.14 mg, and showed the specific rotation of $[\alpha]_D^{25} = -332°$.

The polymer contained in the 1st–5th fractions amounted to 25.17 mg in total, and showed the specific rotation (mean value) of $[\alpha]_D^{25} = -288.7°$.

OPTICAL RESOLUTION EXAMPLE 16

1.0 g of triphenylmethyl methacrylate was dissolved in 10 ml of THF, and this monomer was polymerized at −75° C. in the presence of lithium (R)-(1-phenylethyl)anilide in the amount of 5 molar % based on the amount of the monomer. There was obtained 0.98 g of a polymer having a polymerization degree of 21 and showing a specific rotation of $[\alpha]_D^{20} = -104°$.

70 mg of the thus-obtained polymer was dissolved in 2 ml of toluene, and was subjected to the optical resolution employing the same column as described in Optical Resolution Example 15. The development was carried out with toluene at the rate of 1.1 ml/hour, and the eluate was collected to give 2.5 ml fractions.

The polymer contained in the first fraction amounted to 12.51 mg, and showed a specific rotation of $[\alpha]_D^{25} = -366°$ (in toluene).

The polymer contained in the 1st–6th fractions amounted to 45.15 mg in total, and showed a specific rotation (mean value) of $[\alpha]_D^{25} = -301.2°$ (in toluene).

OPTICAL RESOLUTION EXAMPLE 17

1.0 g of triphenylmethyl methacrylate was dissolved in 10 ml of THF, and the monomer was polymerized at −78° C. in the presence of butyllithium in the amount of 5 molar % based on the monomer. There was obtained 0.95 g of the polymer having a polymerization degree of 22.

68 mg of the thus-obtained polymer was dissolved in 2 ml of toluene, and subjected to the optical resolution employing the same column as in Optical Resolution Example 14, under the same conditions as in Optical Resolution Example 16.

The polymer contained in the first fraction amounted to 14.28 mg, and showed the specific rotation of $[\alpha]_D^{25} = -247°$.

The polymer contained in the 1st~6th fraction amounted to 33.7 mg in total, and showed the specific rotation (mesh value) of $[\alpha]_D^{25} = -215°$.

OPTICAL RESOLUTION EXAMPLE 18

To porous silica gel, 2.47 g of Li Chrosper SI 1000 (trademark) produced by Melk. Co., which had been dried, was added 15 ml of toluene, 2 ml of triethylamine and 2 ml of diphenyldichlorosilane. The mixture was reacted at room temperature for 1 hour and further was refluxed for 3 hours. To 150 ml of methanol was added the reaction mixture and the insoluble was separated out by filtration. It was sufficiently washed with methanol and dried. An amount of the product was 2.75 g.

To the silica gel which had been prepared in the manner as described above, was added 5 ml of THF (tetrahydrofuran) solution containing 0.41 g of (+)-triphenylmethyl polymethacrylate obtained in Synthesis Example 3. Then, THF was distilled out. The residue was sufficiently washed with methanol.

Figure 3:
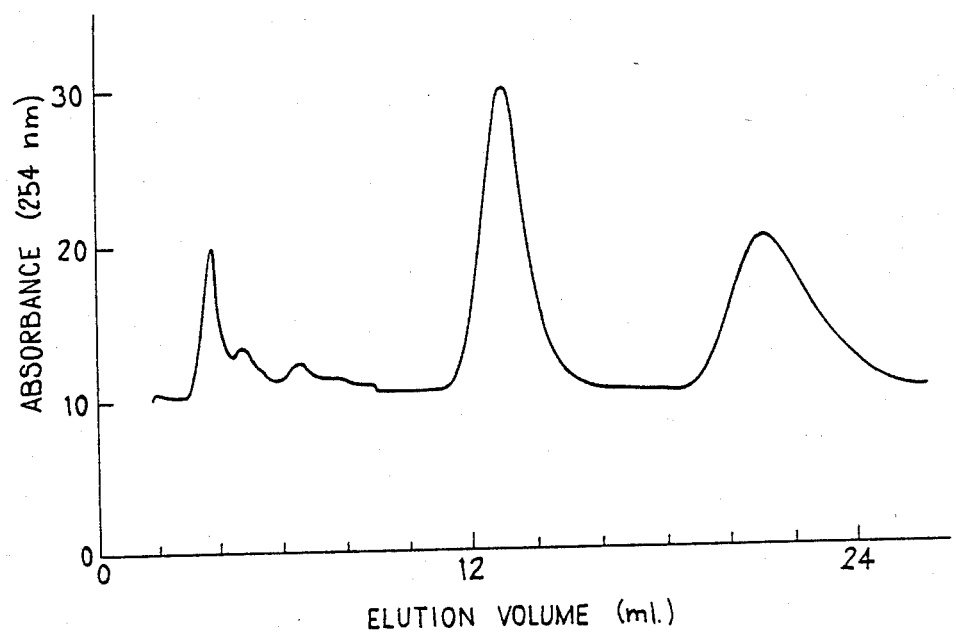
FIG. 3 is a graph showing results obtained in Optical Resolution Example 18.

The optical resolution was carried out by a high-speed liquid chromatography, using an apparatus manufactured by Japan Spectroscopy Co., Ltd. and a column filled with the above obtained packing material. A tested compound was trans-1,2-cyclohexanediol-dibenzoate dissolved in methanol. Methanol was used as a carrier. A result is shown in FIG. 3. It is seen that the resolution result was improved in this example.

OPTICAL RESOLUTION EXAMPLE 19-34

A stainless-steel column (25×0.46 cm) was packed with (+)-poly(triphenylmethyl methacrylate) obtained in Synthesis Example 1, ground so as to have an average size of 20 to 50 microns by the slurry technique. The packed column gave 2200 and 1800 theoretical plates for acetone and benzene, respectively. The dead volume of the column was estimated to be 3.4 mL with water. Various racemates were tested for the purpose of optical resolution, using the column. The high-performance liquid chromatography was accomplished on a Japan Spectroscopy Co. Twincle chromatograph with a Japan Spectroscopy Co. UV-254-II detector at about 20±1° C. The flow rate of methanol was 0.72 mL/min. Results are shown in Table I.

TABLE I

Liquid Chromatographic Resolution of Racemic Compounds

| Example No. | racemate | | k' and (rotation)[b] less bound | k' and (rotation)[b] more bound | $\alpha^c$ | Rs |
|---|---|---|---|---|---|---|
| 19 | binaphthyl di-O-R | R: —H | 1.50 (+) | 3.20 (−) | 2.13 | 2.39 |
| 20 | | R: —H and —CH₃ | 3.78 (+) | 6.67 (−) | 1.76 | 1.86 |
| 21 | | R: —CH₃ | 9.67 | 15.94 | 1.65 | 1.39 |
| 22 | cyclohexane-1,2-di(COR) | R: —OPh | 4.39 (+) | 5.68 (−) | 1.29 | 1.05 |
| 23 | | R: —NHPh | 1.47 (−) | 5.21 (+) | 3.54 | 1.48 |
| 24 | cyclohexane-1,2-di-OCOPh | | 4.88 (+) | 7.06 (−) | 1.45 | 1.68 |
| 25 | cyclohexane-1,3-di-OCOPh | | 4.07 (+) | 6.67 (−) | 1.66 | 2.07 |
| 26 | menthyl OCOPh | | 2.06 (−) | 2.44 (+) | 1.19 | 0.7 |
| 27 | CH₃-CH(OCOPh)-CH₂-CH(OCOPh)-CH₃ | | 1.94 (+) | 2.56 (−)[e] | 1.32 | 0.93 |
| 28 | (CH₃—CH)₂S, Ph | | 1.83 (+) | 2.99 (−)[f] | 1.63 | 1.72 |
| 29 | 2,3-dimethyloxirane | | 2.27 (−) | 4.92 (+) | 2.17 | 2.39 |
| 30 | cyclopropane CH₂Ph / CONHPh | | 0.71 (−) | 1.04 (+) | 1.46 | 0.98 |
| 31 | dimethyl diazocine | | 1.74 (+) | 3.08 (−) | 1.77 | 2.15 |
| 32 | Hexahelicene | | 5.12 (−) | >69 (+) | >13 | >1 |

TABLE I-continued

Liquid Chromatographic Resolution of Racemic Compounds

| Example No. | racemate | k' and (rotation)[b] less bound | more bound | α[c] | Rs |
|---|---|---|---|---|---|
| 33 | (anthracene)-CH(OH)-CF₃ | 0.61 (+) | 0.96 (−) | 1.57 | 1.10 |
| 34 | Ph₃—C—O—CH(CH₃)—Ph | 6.06 | 8.10 | 1.34 | 0.6 |

Notes are:

[b]Capacity factor = (retention time of enantiomer − dead time)/dead time.
[c]Separation factor = (k' of more bound enantiomer)/(k' of less bound enantiomer).
[d]Resolution factor = 2(distance between the peaks of more and less bound enantiomers)/(sum of bandwidths of two peaks).
[e]The k' for meso isomer was 3.26.
[f]The k' for meso isomer was 2.38.

OPTICAL RESOLUTION EXAMPLES 35–43

Liquid chromatographic resolution tests of various racemic compounds were conducted with (+)-poly(triphenylmethyl methacrylate), $[\alpha]_D^{20} + 300°$ C. (THF), coated on porous silica gel. The high-performance liquid chromatography was accomplished on a JASCO Twincle chromatograph equipped with a JASCO UV-254-II detector at about 20° C. Methanol was used as solvent. Flow rate was 0.5 ml/min. The adsorbents were packed in a stainless steel column (25×0.46 cm (i.d.)) by the slurry technique. The theoretical plates for acetone were 4200 for columns 1L-29-1 and 1L-28-1 and 3600 for column 1M-04-1 at a flow rate of 0.5 ml/min. The dead volume of the columns were 3.4–3.5 ml. Three packing material (adsorbent) to be charged into columns were prepared by the following respective procedures.

1L-29-1

2.50 g of silica, LiChrospher SI 1000 available from E. Merck was added to a solution consisting of 0.375 g of poly(triphenylmethyl methacrylate) and 5.0 ml of tetrahydrofuran (THF). Thereafter, THF was distilled out. The obtained product was dried under a reduced pressure and washed with methanol.

1L-28-1

2.50 g of LiChrospher SI 1000 was treated with an excess amount of diphenyldichlorosilane and triethylamine and washed with methanol, followed by drying to give diphenylsilated silica. The treated silica was added to a solution of 0.375 g of poly(triphenylmethyl metharylate) in 5.0 ml of THF. THF was then distilled out. The product was dried under a reduced pressure and washed with methnol.

1M-04-1

2.50 g of silica, LiChrospher SI 500 available from E. Merck was treated with diphenyldichlorosilane. The obtained diphenylsilated silica was added to a solution of 0.55 g of poly(triphenylmethyl metharylate) in 5.0 ml of THF. THF was distilled out. The product was dried under a reduced pressure, washed with methanol and dried. Thereafter it was allowed to stand in toluene for one hour and separted by filtration. The resulting product was subsequently dried, washed with methnol and dried again.

Results are shown in Table 2. The racemates in Examples 42 and 43 are trisacetylacetonatochromium and trisacetylacetonatocobalt, respectively.

Note of (b) to (d) in Table 2 correspond to those of Table 1.

TABLE 2

| Example No. | Racemate | Column | k'[b] less bound | more bound | α[c] | Rs[d] |
|---|---|---|---|---|---|---|
| 35 | binaphthol (OH, OH) | 1L-29-1 | 0.30 | 0.63 | 2.10 | 1.91 |
|  |  | 1L-28-1 | 0.26 | 0.55 | 2.12 | 1.85 |
|  |  | 1M-04-1 | 0.43 | 1.08 | 2.51 | 3.46 |
| 36 | trans cyclohexane(OCOPh, OCOPh) | 1L-29-1 | 2.32 | 3.72 | 1.59 | 1.23 |
|  |  | 1L-28-1 | 2.68 | 5.03 | 1.88 | 2.16 |
| 37 | trans cyclohexane(OCOPh, OCOPh) | 1L-29-1 | 1.15 | 1.66 | 1.44 | 1.17 |
|  |  | 1L-28-1 | 0.98 | 1.33 | 1.24 | 0.93 |

TABLE 2-continued

| Example No. | Racemate | Column | k'[b] less bound | k'[b] more bound | α[c] | Rs[d] |
|---|---|---|---|---|---|---|
| 38 | trans (cyclopropane with CONHPh and Ph) | 1L-29-1 | 0.23 | 0.30 | 1.30 | 0.66 |
| | | 1L-28-1 | 0.18 | 0.24 | 1.33 | 0.5 |
| 39 | Ph$_3$C—O—CH(Ph)—CH$_3$ | 1L-29-1 | 1.61 | 1.96 | 1.3 | 0.3 |
| 40 | Tröger base | 1L-28-1 | 0.32 | 0.59 | 1.84 | 1.81 |
| 41 | trans (epoxide with Ph, Ph) | 1L-29-1 | 0.45 | 2.35 | 5.24 | 3.03 |
| | | 1L-28-1 | 0.29 | 1.51 | 5.22 | 3.09 |
| 42 | Cr(acac)$_3$ | 1L-28-1 | 0.24 | 0.33 | 1.35 | 0.5 |
| 43 | Co(acac)$_3$ | 1L-28-1 | 0.23 | 0.33 | 1.44 | 0.5 |

The embodiments of the invention in which an exclusive property or privilege is claimed are defined as follows:

1. A process for the optical resolution of a racemic mixture which comprises contacting the racemic mixture with a stereoregular, highly isotactic, optically active polymer comprising recurring structural units of the formula:

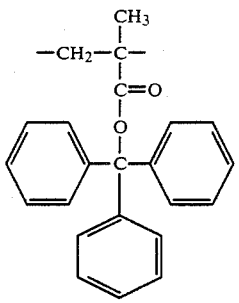

and having a polymerization degree of not less than 5, said polymer having a specific rotation $[\alpha]_D^{20}$ of not less than 50° as an absolute value, either + or −.

2. A process as claimed in claim 1, in which said polymer consists of an isotactic homopolymer of triphenylmethyl methacrylate having a helical structure predominantly of one screw sense, said polymer being insoluble in methanol and having absorption bands at 208 nm, 232 nm and four absorption bands in the range of 257 to 280 nm in the circular dichroism spectrum.

3. A process as claimed in claim 1, in which the polymerization degree of the polymer is not less than 20.

4. A process as claimed in claim 1, in which the polymerization degree of the polymer is not less than 50.

5. A process as claimed in claim 1, in which the polymerization degree of the polymer is not less than 100.

6. A process as claimed in claim 1, in which the racemic mixture is flowed through a chromatography column packed with a packing material comprising said optically active polymer.

7. A process as claimed in claim 6, in which said packing material is particles consisting essentially of said optically active polymer and particles of another inert solid substance.

8. A process as claimed in claim 7, in which said inert solid substance is porous microparticles of a material selected from the group consisting of silica, alumina, glass beads, polystyrene resin, polyamide resin and polyacrylate resin.

9. A process as claimed in claim 7, in which said inert solid substance is porous microparticles of silica.

* * * * *